United States Patent
Klosa

[15] 3,673,185
[45] June 27, 1972

[54] KETONES OF THE THIAMINE SERIES AND THEIR PRODUCTION

[72] Inventor: Josef Klosa, Berlin, Germany

[73] Assignee: Fischer & Fischer GmbH, Baden, Germany

[22] Filed: May 1, 1969

[21] Appl. No.: 821,077

[30] Foreign Application Priority Data

May 6, 1968 Germany.....................P 17 70 338.7

[52] U.S. Cl..........................................260/256.5 B, 260/999
[51] Int. Cl. .......................................................C07d 51/42
[58] Field of Search..........................................260/256.5 B

[56] References Cited

UNITED STATES PATENTS 3,312,704  4/1967  Takamizawa et al. ...............260/256.5

*Primary Examiner*—Alex Mazel
*Assistant Examiner*—R. J. Gallagher
*Attorney*—Waters, Roditi, Schwartz & Nissen

[57] ABSTRACT

5-mono-substituted ketones of the thiamine series having the formula:

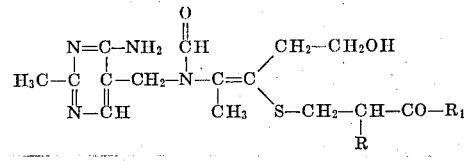

wherein R is hydrogen or an alkyl radical and $R_1$ is an aryl or heterocyclic radical are produced by reacting thiamine or a mineral acid salt thereof with a compound of the formula:

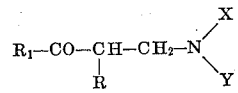

wherein R and $R_1$ are as defined above and X and Y are independently selected from the group consisting of lower alkyl radicals.

15 Claims, No Drawings

KETONES OF THE THIAMINE SERIES AND THEIR PRODUCTION

DETAILED DESCRIPTION

The present invention relates to S-mono-substituted ketones of the thiamine (i.e. vitamin $B_1$) series having the formula:

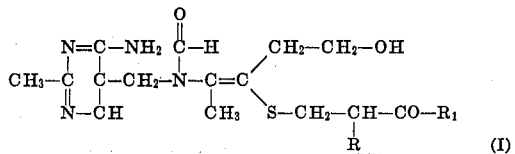

wherein R is hydrogen or an alkyl radical, preferably a lower alkyl radical, and $R_1$ is a substituted or unsubstituted aryl or heterocyclic radical; and it further relates to the production thereof. When used in the present specification and claims, the term "lower alkyl" refers to alkyl radicals having one to six carbon atoms, especially one to four carbon atoms. The preferred alkyl radicals are methyl and ethyl.

It has been found that compounds of formula (I), which have not heretofore been described, have pronounced pharmacological and biological properties, and exhibit good vitamin $B_1$ resorption in the intestine, a long lasting $B_1$ action, and also, depending on the nature of the substituents R and $R_1$, a settling and soothing action as well as a restorative action, and finally are effective in protecting the liver and gall bladder.

This new class of compounds of the thiamine series of the formula (I) is obtained by a novel, and surprisingly simple process which has not been previously described.

There is known a process for producing thiamine derivatives with better resorption than is the case with vitamin $B_1$ (see H. Kobayashi, K. Yasuda and Y. Kowa, The Journal of Vitaminology 8, 252 (1962)).

In all these cases, the relevant compounds are obtained by a process in which the thiazole ring of the thiamine molecule is cleaved by treating the thiamine with alkali alcoholates, so that a hydrogen atom of the sulphydryl group is replaced by the alkali. The alkali salt of the thiamine is thereafter reacted with a haloalkyl compound to form an S-alkyl thiamine derivative, and in this reaction, depending on the operating conditions, the hydroxyl group may also be etherified. The operations must be carried out under substantially anhydrous conditions and with very involved manipulations (British Pat. No. 963,626, German Pat. No. 1,253,717, German Pat. No. 1,249,283). The yields achieved thereby are only moderate.

Be contrast therewith, it has now been found that ketones of the thiamine series of formula (I) are obtained by reacting thiamine or a mineral acid salt thereof with a compound of the formula:

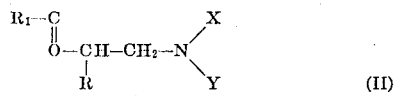

wherein X and Y are independently selected from the group consisting of lower alkyl radicals, such as methyl or ethyl, and R and $R_1$ are as defined above; the reaction taking place in the presence of an alkali, preferably a mild alkali, such as sodium bicarbonate or ammonia. When an alkali salt of thiamine is used as the starting material, the separate use of alkali is unnecessary. The reaction is simple: for example, for the preparation of S - $\beta$ - benzoylethyl - thiamine of the formula:

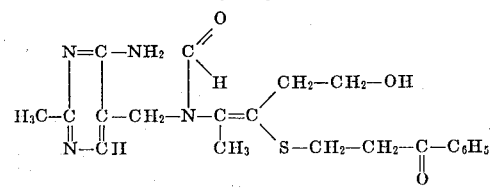

thiamine hydrochloride and $\beta$-dimethylaminopropiophenone hydrochloride are dissolved in equimolar proportions in water. Aqueous ammonia is slowly added dropwise to the clear solution while stirring, and with slow dropwise addition, as soon as a pH value of 7 is exceeded, fine colorless needles of the S-$\beta$-benzoylethyl-thiamine are precipitated. With rapid dropwise addition of the ammonia, an oil initially precipitates which then solidifies into needles. A simple recrystallization from methanol provides a snow white product, in a yield of 95 percent, i.e. a practically quantitative yield.

In another modification of the process in accordance with the invention, a mineral acid salt of thiamine, e.g. thiamine hydrochloride, is caused to react with $\beta$-dimethylaminopropiophenone hydrochloride in 50 percent methanol, with the addition of an equivalent amount of sodium bicarbonate, and with heating to 50° to 60° C. for a few minutes to form S-$\beta$-benzoylethyl-thiamine, likewise with practically quantitative yields.

The new ketones of the thiamine series of the formula (I) as thus prepared are insoluble in water and soluble in alcohols. With the aid of pharmaceutically acceptable non-toxic acids, they can be transformed into their water-soluble salts.

Suitable $\beta$-dialkylaminoketones of the formula (II), are for example, $\beta$-dimethyl amino- or $\beta$-diethylaminopropiophenone and the many different types of substitution products thereof, e.g. $\beta$-dimethylamino-p-chloro-, -p-nitro-, -p-methoxy-, -p-bromo-, or -p-methyl-propiophenone, $\beta$-dimethylamino-m-nitro-, -m-methoxy-, -m-chloro-, -m-methyl-, or -m-bromo-propiophenone, $\beta$-dimethyl-amino-p-hydroxy-m-methoxypropiophenone, $\alpha$-methyl-$\beta$-dimethyl amino-propiophenone, $\alpha$-methyl-$\beta$-dimethylamino-p-chloropropiophenone, 1-$\beta$-dimethylamino-propionylnaphthalene, 2-$\beta$-dimethylamino-propionylthiophen, and others, or, briefly stated, any $\beta$-dialkylaminopropioketones which can be prepared by a Mannich reaction from fatty aromatic or heterocyclic ketones and dialkylamines, such as dimethyl- or diethylamine.

This entire reaction is very surprising, since similar reaction of $\beta$-dialkylaminopropiophenones in such an easy manner with sulphydryl groups or other simple sulphydryl compounds are unknown, and it is only in certain cases that such a reaction is known to occur, but then only in acid medium and with moderate yields. Thiamine salts, however, do not react in acid medium with $\beta$-dialkyl-aminopropiophenones. When such a reaction is attempted, the unchanged initial reactants are once again obtained. Thus, the unobvious novelty of the present process is demonstrated.

The new compounds are odorless.

The compounds of formula (I) and their salts may be used as a therapeutic and as an intermediate in the preparation of other therapeutics. They may be administered either alone or in the form of pharmacologically active compositions in admixture with a therapeutically inert carrier or diluent.

Some examples of the advantageous preparation of the class of compounds and of the process according to the invention are given below.

EXAMPLE 1

Seventeen grams of thiamine hydrochloride, 12g. of $\beta$-dimethylaminopropiophenone hydrochloride, and 5g. of sodium bicarbonate are dissolved or suspended in 100 ml. of 50 percent aqueous methanol. The entire reaction mixture is heated on a water bath. After 15 minutes, a clear solution forms. Heating is continued for another 15 minutes, whereupon the solution is filtered off while warm to remove clouding substances and mechanical impurities. To the crystal-clear filtrate, twice the initial volume of water is added. After standing for a brief period, fine, colorless needles are crystallized out and are filtered off. Recrystallization can be effected from a large quantity of methanol.

Yield 21 g. M.p.: 88°–90° C, S-$\beta$-benzoylethyl-thiamine. The product is very readily soluble in mineral acid solution, and is precipitated as needles from the latter by adding ammonia.

Hydrochloride of S-$\beta$-benzoylethyl-thiamine.

The free base is dissolved in alcoholic hydrochloric acid, acetone is added and the mixture is concentrated by evaporation under vacuum. The crystalline residue is triturated with acetone, and colorless crystals which are very readily soluble in water are obtained:
M.p.: 155°–157° C.

EXAMPLE 2

Seventeen grams of thiamine hydrochloride and 12 g. of β-dimethylamino-p-methylpropiophenone hydrochloride are dissolved in approximately 100 ml. of water. Aqueous ammonia solution is introduced dropwise into this solution while stirring and at ambient temperature, until the pH value is 8 or a generally weak odor of ammonia still exists. The time taken for the addition is about 1 hour. The reaction material first of all assumes a milky cloudiness and then colorless crystals precipitate. The whole is left standing for several hours and after the odor of ammonia has disappeared, more ammonia is added and suction filtering is carried out. In the event that the oil has not become crystalline, it is triturated with methanol.

Yield 22 g. M.p.: 110°–112° C., S-β-p-methyl-benzoylethylthiamine.

Hydrochloride: Dissolve the free base in alcoholic hydrochloric acid, add acetone and leave standing. After several hours, colorless needles precipitate. M.p.: 184°–186° C., very readily soluble in water.

In similar manner, by using various B-dialkylaminopropioketones, the compounds as indicated in the following Table are obtained in like yields.

2. A ketone as claimed in claim 1, which is S-β-benzoylethyl-thiamine.

3. A ketone as claimed in claim 1, which is S-β-(p-methylbenzoylethyl)-thiamine.

4. A ketone as claimed in claim 1, which is S-β-(p0chlorobenzoylethyl)-thiamine.

5. A ketone as claimed in claim 1, which is S-β-naphthoylethyl-thiamine.

6. A ketone as claimed in claim 1, which is S-β-thienoylethyl-thiamine.

7. A ketone as claimed in claim 1, which is S-β-(m-methoxybenzoylethyl)-thiamine.

8. A ketone as claimed in claim 1, which is S-β-(m-methoxy-p-hydroxybenzoylethyl)-thiamine.

9. A salt of the ketone as claimed in claim 1 which is the hydrochloride.

10. A ketone as claimed in claim 1 wherein the lower alkyl group is methyl or ethyl.

11. A process for the production of a ketone of the thiamine series having the formula:

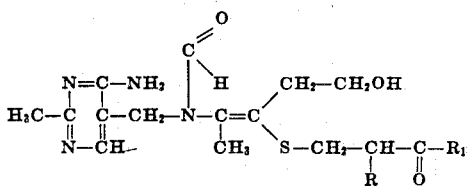

TABLE

S-acylalkyl-thiamines

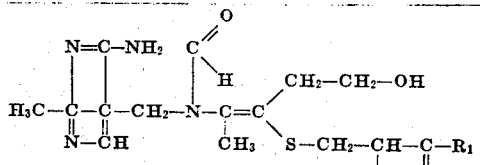

| Number | R | R₁ | M.p. ° C. | M.p. ° C. hydrochloride | Comment |
|---|---|---|---|---|---|
| 1 | CH₃ | —C₆H₅ | 64–66 | | Colorless squares. |
| 2 | H | —C₆H₄NO₂(p) | 118–120 | | Ochre-yellow crystal powder. |
| 3 | H | —C₆H₄—Cl(p) | 134–136 | | Colorless needles. |
| 4 | H | —C₆H₄·CH₃(p) | 108–110 | 128–130 | Do. |
| 5 | H | (thienyl) | 62–64 | | |
| 6 | H | (naphthyl) | Oil | 112–114 | Hygroscopic. |
| 7 | H | —C₆H₄Br(p) | 116–118 | | Colorless needles. |
| 8 | H | —C₆H₄—O·CH₃(m) | 98–100 | | Do. |
| 9 | H | (hydroxy-methoxyphenyl) | 103–105 | | Yellowish crystal meal. |

What is claimed is:

1. A ketone of the thiamine series having the formula:

H₃C—C(=N—CH)—C(—NH₂=N)—CH₂—N(—C(=C)(CH₃)—S—CH₂—CH(R)—C(=O)—R₁)—C(=O)H ... CH₂—CH₂—OH wherein R is hydrogen or a lower alkyl group, and R₁ is a phenyl, chlorophenyl, bromophenyl, methylphenyl, nitrophenyl, hydroxyphenyl, methoxyphenyl, hydroxymethoxyphenyl, naphthyl or thienyl group, and water-soluble, pharmaceutically acceptable, non-toxic acid addition salts thereof.

wherein R is hydrogen or a lower alkyl group and R₁ is a phenyl, chlorophenyl, bromophenyl, methylphenyl, nitrophenyl, hydroxyphenyl, methoxyphenyl, hydroxymethoxyphenyl, naphthyl or thienyl group, said process comprising reacting thiamine or a mineral acid salt thereof, in the presence of a mild alkali at ambient temperature in aqueous or in aqueous-methanolic solution with a compound of the formula:

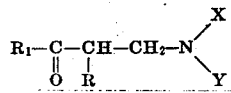

wherein X and Y are independently selected from the group consisting of lower alkyl groups, and R and R₁ are as defined above.

12. A process as claimed in claim 11 wherein the lower alkyl group is methyl or ethyl.

13. A process as claimed in claim 11 wherein the mild alkali is ammonia.

14. A process as claimed in claim 11 wherein thiamine hydrochloride is reacted.

15. A process as claimed in claim 11 wherein the mild alkali is sodium bicarbonate and the reaction is effected at a temperature of 50°–60° C.

* * * * *